United States Patent
Liu et al.

(10) Patent No.: US 12,475,808 B2
(45) Date of Patent: Nov. 18, 2025

(54) BREAST FEEDING COACHING METHOD, DEVICE AND APPLICATION THEREOF

(71) Applicant: NUTRICIA EARLY LIFE NUTRITION (SHANGHAI) CO., LTD., Shanghai (CN)

(72) Inventors: Mengjin Liu, Shanghai (CN); Bingzhi Guo, Shanghai (CN); Jiangnan Wang, Shanghai (CN); Yi Fu, Guangdong (CN)

(73) Assignee: Nutricia Early Life Nutrition (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/549,180

(22) PCT Filed: Apr. 1, 2021

(86) PCT No.: PCT/CN2021/084928
§ 371 (c)(1),
(2) Date: Sep. 6, 2023

(87) PCT Pub. No.: WO2022/205305
PCT Pub. Date: Oct. 6, 2022

(65) Prior Publication Data
US 2024/0161646 A1     May 16, 2024

(51) Int. Cl.
*G09B 5/06*     (2006.01)
*G06T 7/73*     (2017.01)
(Continued)

(52) U.S. Cl.
CPC .............. *G09B 5/065* (2013.01); *G06T 7/73* (2017.01); *G06V 40/10* (2022.01); *G09B 5/02* (2013.01);
(Continued)

(58) Field of Classification Search
CPC .. G09B 5/065; G09B 5/02; G09B 5/04; G06T 7/73; G06T 2207/30196; G06V 40/10;
(Continued)

(56) References Cited

U.S. PATENT DOCUMENTS 6,701,207 B1 * 3/2004 Gazzuolo ............... G06Q 30/02
                                                         33/2 R
2013/0110004 A1 * 5/2013 McLane ............... A61B 5/4561
                                                         600/587
(Continued)

FOREIGN PATENT DOCUMENTS

CN      104867281 A      8/2015
CN      106919250 A      7/2017
(Continued)

*Primary Examiner* — Jack Yip
(74) *Attorney, Agent, or Firm* — Ipsilon USA—NLO

(57) ABSTRACT

A method for breast feeding coaching comprises capturing at least one image; displaying the at least one image; identifying whether a posture of a person in the at least one image is correct according to a plurality of rules for breast feeding; dynamically notifying the person to adjust the posture of the person until each of the plurality of rules is met; starting a timer to indicate that breast feeding starts; further identifying the posture of the person and notifying the person to adjust the posture of the person according to the plurality of rules during the breast feeding; ending and recording the timer when the breast feeding ends.

15 Claims, 3 Drawing Sheets

(51) Int. Cl.
  *G06V 40/10* (2022.01)
  *G09B 5/02* (2006.01)
  *G09B 5/04* (2006.01)
  *G06V 40/16* (2022.01)
  *G06V 40/20* (2022.01)
  *G16H 20/30* (2018.01)
  *G16H 30/40* (2018.01)
  *G16H 40/63* (2018.01)

(52) U.S. Cl.
  CPC ...... *G09B 5/04* (2013.01); *G06T 2207/30196* (2013.01); *G06V 40/161* (2022.01); *G06V 40/23* (2022.01); *G16H 20/30* (2018.01); *G16H 30/40* (2018.01); *G16H 40/63* (2018.01)

(58) Field of Classification Search
  CPC ...... G06V 40/161; G06V 40/23; G16H 20/30; G16H 30/40; G16H 40/63
  See application file for complete search history.

(56) References Cited

U.S. PATENT DOCUMENTS

| | | | |
|---|---|---|---|
| 2013/0177888 A1 | 7/2013 | Daullary | |
| 2014/0242213 A1* | 8/2014 | McCarty | A61J 15/0076 222/146.2 |
| 2019/0060088 A1* | 2/2019 | Meikle | A61J 7/0015 |
| 2019/0088357 A1* | 3/2019 | Lee | A61B 5/4812 |
| 2020/0078502 A1* | 3/2020 | Bartlett | A61M 1/06 |
| 2020/0121241 A1* | 4/2020 | Hafezi | A61B 5/7475 |
| 2020/0197818 A1* | 6/2020 | Ma | A63F 13/424 |
| 2021/0307711 A1* | 10/2021 | Vancamberg | A61B 6/0414 |
| 2022/0395218 A1* | 12/2022 | Hamelmann | A61B 5/6804 |

FOREIGN PATENT DOCUMENTS

| | | | | |
|---|---|---|---|---|
| CN | 108245172 A | 7/2018 | | |
| CN | 108415284 A | 8/2018 | | |
| CN | 108830144 A | 11/2018 | | |
| CN | 110666791 A | 1/2020 | | |
| CN | 111863230 A | * 10/2020 | ........... | G06F 17/142 |
| CN | 112037482 A | 12/2020 | | |
| CN | 112132110 A | 12/2020 | | |
| CN | 112237730 A | 1/2021 | | |
| KR | 20120128360 A | * 11/2012 | ........... | G06F 17/142 |
| KR | 1020120128360 A | 11/2012 | | |
| KR | 101480026 B1 | 1/2015 | | |
| KR | 20190036929 A | 4/2019 | | |
| KR | 102137445 B1 | 7/2020 | | |
| WO | WO 201808935 A1 | 1/2018 | | |
| WO | WO 2019216453 A1 | 11/2019 | | |
| WO | WO 202037863 A1 | 2/2020 | | |
| WO | WO 202037962 A1 | 2/2020 | | |
| WO | WO 2020215854 A1 | 10/2020 | | |
| WO | WO 2020228217 A1 | 11/2020 | | |

* cited by examiner

BREAST FEEDING COACHING METHOD, DEVICE AND APPLICATION THEREOF

FIELD OF THE INVENTION

The present invention relates to a breast feeding coaching method, device and application thereof.

BACKGROUND

In post-covid, half of moms intend to breast feed longer to give the best immunity to their babies. However, only 29% moms continue breastfeeding in the first six months. During breastfeeding, 52% of moms don't have sufficient breastmilk, while 27% of moms think breast feeding is painful. It is important to help moms solve or at least ease these issues. Furthermore, no all moms have private coaches to teach them the correct way to breast feed their babies which may cause difficulty for the baby to obtain milk and/or moms to deliver milk. Thus, a coaching method, device and application for correct breast feeding postures of moms and/or babies is needed.

The present invention helps pregnant or lactating women to learn and correct their breastfeeding postures directly at home thereby improving their breastfeeding experience.

SUMMARY OF THE INVENTION

The present invention relates to a breast feeding coaching method, device and application thereof.

According to an embodiment of the present invention, a method for breast feeding coaching comprises: capturing at least one image; displaying the at least one image; identifying whether a posture of a person in the at least one image is correct according to a plurality of rules for breast feeding; dynamically notifying the person to adjust the posture of the person until each of the plurality of rules is met; starting a timer; further identifying the posture of the person and notifying the person to adjust the posture of the person according to the plurality of rules during the breast feeding; ending and recording the timer when breast feeding ends.

According to an embodiment of the present invention, an electronic device comprises a camera, a display, and a processer to perform the method of the present invention.

According to an embodiment of the present invention, a storage medium and a program/software are configured to store instructions executed by at least one processor to perform the method of the present invention.

BRIEF DESCRIPTION OF THE DRAWINGS

The present invention will be discussed in more detail below, with reference to the attached drawings, in which.

DESCRIPTION OF EMBODIMENTS

Figure 1:
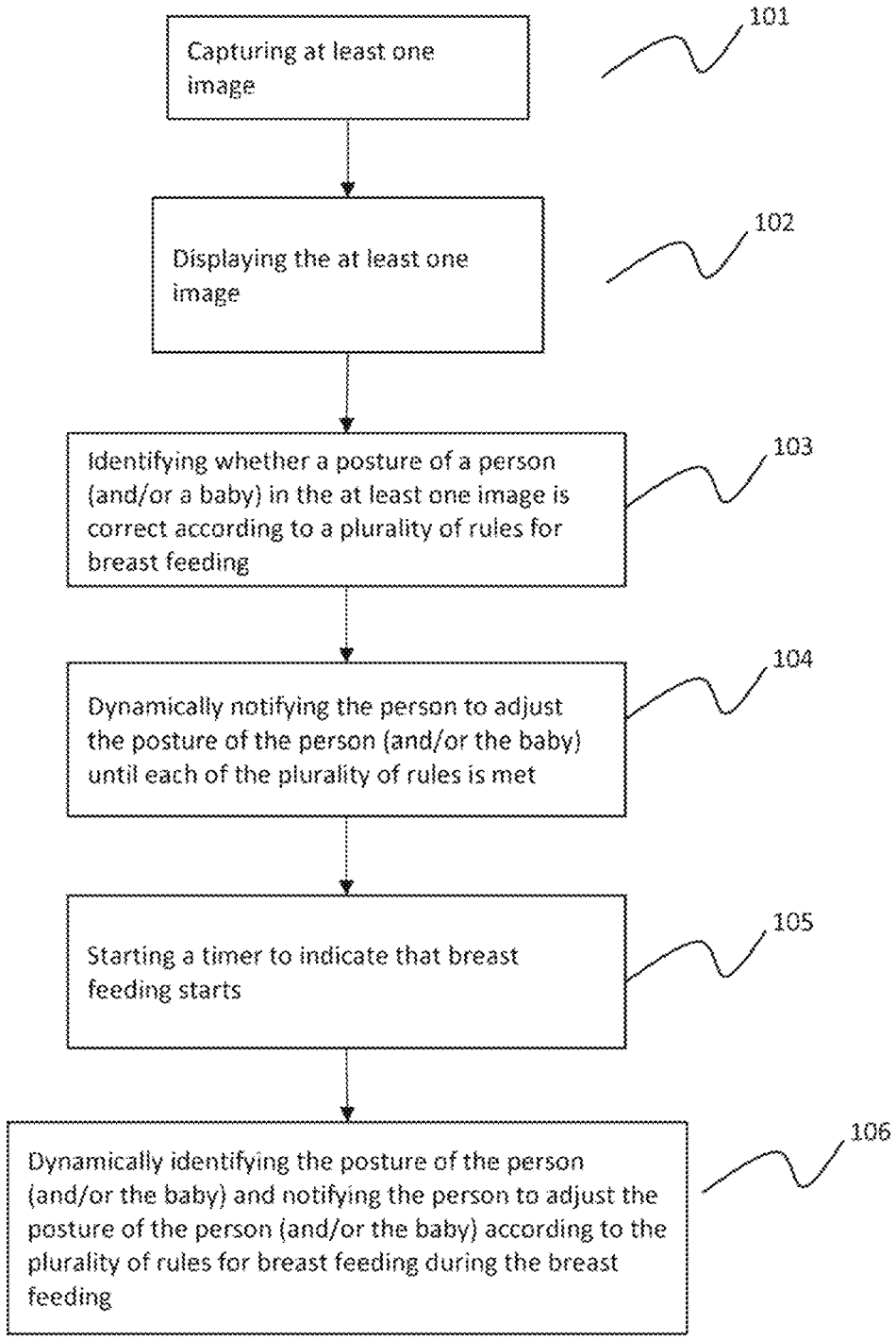
FIG. 1 shows a method for breast feeding coaching.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first printing form and a second printing form may indicate different printing forms regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

FIG. 1 shows a method for breast feeding coaching. Some steps shown in FIG. 1 may be omitted and the order of the steps may be in a different sequence.

In step 101, at least one image (used interchangeably with "the image", and "the images" in this document) is captured. This may be via a separate camera, or an integrated camera in an electronic device, e.g., a mobile phone, a tablet, a laptop, a desktop, a TV, etc. The image may be captured continuously or one image in each predetermined period (e.g., one image in each second).

Before this step, a user (e.g., in this application, the user may be the mom, or someone else assisting the mom) may start the breast feeding coaching application installed (and/or stored) on the electronic device (for example, an app on a smart phone). Then the device may identify (e.g., performed by at least one processor) whether there is a usable camera. If no usable camera is identified, the method stops, or plays at least one or more instructions (e.g., texts, images, videos, audio, animations, etc.) on the device to give general instructions to the mom.

If a usable camera is detected, the user may be asked to agree on using the camera. For example, when the user inputs to indicate agreeing to use the camera, later steps are performed, e.g., in FIGS. 1 and 2. Otherwise, the same steps as no camera identified are performed.

Before and/or during step 101, the user may be notified with some general guidance, e.g., "please keep a certain distance to the camera/device (e.g., 0.5 to 3 meters, or 1 meter)"; "the method will count down five seconds before capturing images", "please relax and sit/lying comfortably", etc.

In step 102, the image is displayed on a screen/display of the device, for example on a separate display/monitor/screen, or an integrated display unit, e.g., on a mobile phone, a tablet, a laptop and so on. A single image or a video formed by captured images may be displayed, e.g., a live stream captured by the camera.

The image may be displayed as mirrored which helps the mom to adjust her and/or the baby's posture easily.

Note that in this document, the "baby" may be a real baby or a fake baby, e.g., a doll, a roll of blanket, etc. The fake baby may be used by a mom to practice breast feeding.

In step 103, identify whether a posture of a person (e.g., a mom) in one for more of the images is correct according to a plurality of rules for breast feeding. The image may be the image(s) captured (and/or displayed) at the moment of performing step 103 or a previous image(s). The person may be a mom or any other person (e.g., a father) who want to try the application. Optionally, the application may or may not identified the gender of the person. In this document, the term "mom" is used interchangeably with the term "person".

This step may include an initial step (which may be omitted) to identify whether a person (e.g., the mom) appears in the image and/or whether the person is in a general feeding posture. The step of identifying of whether a person appears in the image may be omitted, and the step of identifying of whether the person is in a general feeding posture may be omitted as well. If no person appears in the image (e.g., no body part of a person is identified), the device may notify the user to adjust the camera or the position of the mom in order to be in the image, e.g., via at least one of an audio, image, a movie or any other notification method.

Figure 4:
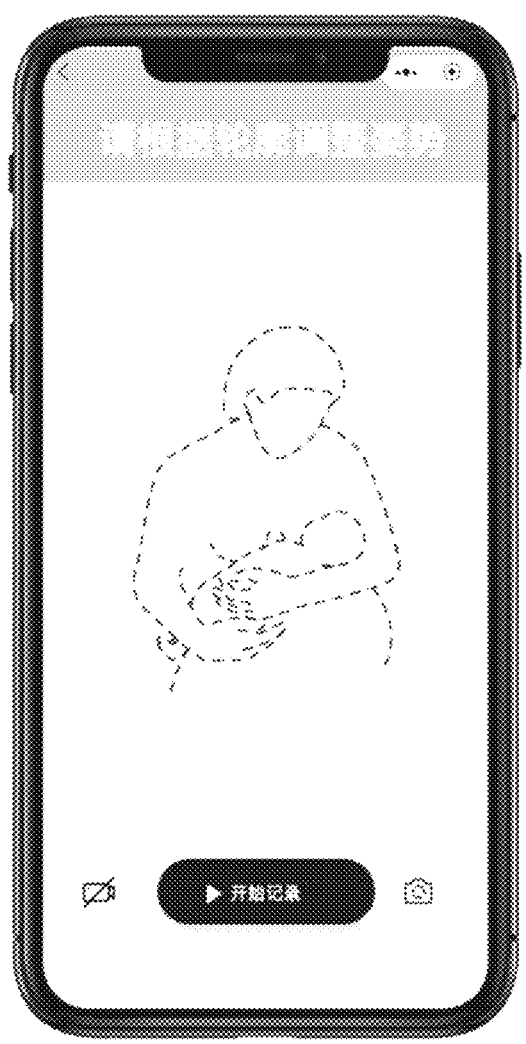
FIG. 4 shows a guiding outline in a sitting breast feeding position.
Figure 5:
FIG. 5 shows a guiding outline in a laying on side breast feeding position.

If it is identified that a person appears (e.g., there is one or more of parts of a person is identified) in the image, the device may further identify whether the person (e.g., the mom) is in a general feeding posture. For example, guiding outlines as shown in FIGS. 4 and 5 may be displayed, and the user is asked to input the feeding type. The feeding type is a general feeding position of the mom and/or the baby, for example, may be a sitting feeding position, a lying on side feeding position or any other feeding position. For example, FIG. 4 shows guiding outline for a sitting breasting feeding position, and FIG. 5 shows guiding outline for a lying on side breast feeding position. Alternatively, the feeding type may be identified automatically by analyzing the image. The mom may be notified by the device to pose according to a guiding outline (that has been identified or selected/input by the user) in order to meet the general feeding posture.

The identifying, that the general feeding posture is met, may include identifying at least one of the basic filtering rules is met by the posture of the mom and/or the baby.

A rule may be considered to be met, if the related posture is according to the rule for longer or equal to a predefined period, or longer than or equal to a threshold period in a predefined period. For example, a rule may be considered to be met if the posture is according to it for the total 5 seconds, or the rule may also be considered to be met if the posture is according to the rule for longer than or equal to 3 seconds in a total 5 seconds. The rules may include:

1. The hips of the mom should be in the image. If not, the mom may be notified to adjust the posture to include her hips in the image.

2. The wrists, elbows and shoulders of the mom should be in the image. The mom may be notified accordingly to adjust her posture.

3. The mom is not too close to and facing the camera. For example, if she is not showing a side of the body in a sitting breast feeding position then she is not facing the camera directly. This may be determined according to the shoulder width of the mom and distance of the ears, and/order length of arms in the image. For example, if the shoulder width in the image is shorter than 1.2 times of the distance of the ears, the device determines that the mom is too close to the camera. The mom may be notified to turn to the camera and keep a longer distance.

4. Not put the camera too high or too low. For example, in a sitting breast feeding position, the device determines this according to the shoulder width and the hip width of the mom in the image. For instance, the camera is too high if the shoulder width is more than 1.2 times of the hip width, and/or the camera is too low if the hip width is more than 1.5 times of the shoulder width. The mom may be notified to higher or lower the camera.

5. At least one or both the elbows of the mom are to not too close to the camera, not too high, and/or not too far from the body of the mom. This may be determined according to the shoulder width as a reference distance in the image by a similar method as in 4.

The body parts of the mom mentioned above may be recognized and abstracted as key points and/or key areas. A key point may be position on a central point of the concerned body part, or on a side point of the concerned body part, or a random position of the concerned body part. For example, key points may include at least one of a right hand, right wrist, right elbow, right shoulder, nose, left palm, left wrist, left elbow, left shoulder, left breast, right breast, left nipple, right nipple, etc. The recognizing/identifying of the key points of a body may be via artificial intelligence and/or image reorganization technologies. A key area may be an area of a concerned body part, e.g., a back area, a head area, a right hand area, right wrist area, right elbow area, right shoulder area, nose area, left palm area, left wrist area, left elbow area, left shoulder area, left breast area, right breast area, left nipple area, right nipple area, etc.

The key point of a hand may be the center point of the back of the hand; the key point of a wrist may be the middle point of a line between the hand and forearm; the key point of an elbow may be the joining point of the forearm and upper arm; the key point of a shoulder may be the joining point of the upper arm and the shoulder; the key point of a head may be the nose (e.g., for the mom) or the ear drop (e.g., for the baby); the key point of a breast may be the nipple position, and/or may be estimated according to the width of the shoulder and upper body length of the mom; the key point of hips may be the middle point or one of the two edge points of the hip bones; the key point of a neck may be the joining point of the upper body and head.

In the initial step, the feeding breast (e.g., left breast or right breast) may be identified as well, e.g., via input of the user, and/or analyzing the image. For example, a feeding breast may be determined according to the head direction of a recognized baby (e.g., the feeding breast is on the same side of the head of the baby). In such a case, the guiding outlines shown in FIGS. 4 and 5 may be adjusted accordingly, e.g., mirrored according to the identified feeding breast. Note that the baby may be a real baby for a fake baby (e.g., a doll).

During the initial step, when the mom has adjusted her posture and/or the baby posture into according to the guiding outlines and meet the basic filtering rules, later steps may be performed. The initial step may be omitted and the device may directly perform step 103 after step 102.

Step 103 identifies whether the mom has a correct posture according to a plurality of rules for breast feeding, e.g., by analyzing the captured image (s) or a subset of the at least one display and/or captured image(s). For example, only one image may be analyzed within each second of the captured and/or displayed video (e.g., displaying more images but only analyzing one image in each second).

This step may include a step of identifying the posture of the mom and/or the baby via key points/key area on the body of the mom and the baby.

The guiding outline may still be displayed during throughout this step and step 103. The identified key points/areas may also be displayed or not displayed. When displaying the key points/areas, the key points may be connected in a structure of a human being and/or the key area may be displayed with a colored area or a box/circle/outline of the key area. The displayed guiding outline and/or key points/areas can help the mom to understand the relative position of the body parts and correct her posture (and/or the baby's) in later steps. The outline and/or key points/areas may be displayed (e.g., mirrored) at the beginning period of this step, the whole step, or until the end of the method.

Furthermore, the posture of the mom may be also categorized into different feeding types, e.g., sitting or lying on side. Moms may breast feed babies mostly in these two positions. The categorizing is according to the identified key points/areas, for example by comparing to the key point/area information in a sitting position and a lying on side position. Alternatively, before step 101, or after step 101 before step 102, or after step 102 and before step 103, the method may include an additional step to receive a user input to select the feeding types.

The plurality of rules may include key point/area information on a correct feeding posture of a mom and/or a baby. The plurality of rules may include different sets of rules based for key point/area information in different feeding types. For example, a sitting feeding position and a lying on side feeding position may have different rules. The correct feeding posture may be obtained via artificial intelligence after training with a large numbers images with correct feeding postures, for example, by subtracting all the key points/areas and obtaining relative positions information (and/or in acceptable ranges) of the key points/areas.

In this step the device may also identify whether a baby present in the at least one image. If a baby is not identified, the method may enter into a breast feeding training mode, where an artificial baby may be displayed. For example, the artificial baby may be displayed in between the arms of the mom when the mom in a sitting position, or may be displayed in front of the upper body of the mom when the mom is in a lying on side position. The artificial baby may be an animation, an image, a movie or any other displayed object that represents a baby.

If a baby is identified (e.g., a real baby for a fake baby), the posture of the baby may be identified as well in additional to the posture of the mom. The identifying of the baby posture may be in a similar way as for the mom, e.g., via identifying key points/areas on the body of the baby. For example, the key points/areas of the baby may include at least one of a head, (left/right) shoulder, back, hips, neck, (left/right) ear, mouth, nose, hands, face, etc. The recognizing/identifying of the key points/area of a body may be via artificial intelligence, e.g., trained with breast feeding images of babies.

If a baby is identified (e.g., a real baby or a fake baby), a guiding outline of the baby or the identified key points/areas of the baby may be displayed as well. The displayed guiding outline and/or key points/areas can help the mom to understand the relative position of the body parts of the mom and/or the baby, and correct the posture of the mom and/or the baby accordingly, e.g., in later steps.

A baby may be fully identified for partially identified (e.g., a real baby or a fake baby), e.g., if all concerned key points/areas are identified or only a part of the key points/areas is identified. The concerned key points/areas may be the key points/areas of the baby that are included in the rules of identifying whether the posture of the mom and the baby are correct.

The posture of an (fully or partially) identified baby may be determined whether to be correct according the above mentioned plurality of rules. For example, the posture of the baby is correct (according to the rules) if the identified key points/areas of the baby have certain relative distances/positions with respect to the other key points/areas of the baby and at least one of the key points/areas of the mom.

The rules may be different in different scenarios according to at least one of whether the concerned key points/areas of the baby and/or the mom is fully identified, left/right breast feeding, and the feeding type (e.g., in a sitting or lying on side breast feeding position). The scenarios may include at least one of:

1. Sitting left breast feeding position with a baby and the key points/areas of the baby are fully identified.
2. Sitting right breast feeding position with a baby and the key points/areas of the baby are fully identified.
3. Sitting left breast feeding position with a baby and the key points/areas of the baby are partially identified.
4. Sitting right breast feeding position with a baby and the key points/areas of the baby are partially identified.
5. Sitting left breast feeding position without a baby.
6. Sitting right breast feeding position without a baby.
7. Lying on side left breast feeding position with a baby and the key points/areas of the baby are fully identified.
8. Lying on side right breast feeding position with a baby and the key points/areas of the baby are fully identified.
9. Lying on side left breast feeding position with a baby and the key points/areas of the baby are partially identified.

10. Lying on side right breast feeding position with a baby and the key points/areas of the baby are partially identified.

11. Lying on side left breast feeding position without baby.

12. Lying on side right breast feeding position without baby.

13. No mom is identified in the image.

Some basic rules may include at least one of:

1. An elbow of the mom needs to supports the neck of the baby;
2. A forearm of the mom needs to support the back of the baby;
3. Relative position of the forearms, hands and wrists of the mom should be proper (e.g., comfortable to the mom);
4. The head of the baby needs to be higher than the hips of the baby;
5. The head (or ear), shoulder and hips of the baby should be in a straight line;
6. The head of the baby faces the feeding breast of the mom and the relative position between the head of the baby and the feeding breast is proper (e.g., not too far such that the baby cannot reach the breast and not too close such that the baby may not breath comfortably).

The breast faced by the head of the baby may be determined as the feeding breast.

When there is no baby identified (e.g., a real baby or a fake baby), only a part or all the basic rules may be considered when identifying the correct breast feeding posture, for example, only the rules 2, 3, and 6 may be included in the rules. A detailed example for the scenario when a baby is not identified is explained later for FIG. 2.

The identifying step 103 (and/or any other identifying step in the present invention) may be performed in the same device of performing the other steps, or may be performed by an external device, e.g., a server. In this case, the device may send the at least one captured image to the external device via a communication unit; after receiving the at least one image, the server may perform the identifying step, then transmitting the identifying results back to the device. When the device receives the result, it performs the remaining steps.

In step 104, the device dynamically notifies the mom to adjust the posture of the mom (and/or the baby) until all the plurality of rules are met.

For example, in step 103, the posture of the mom and/or baby are identified by the rules according to a priority order of the rules. For example, the rule with the highest priority is first identified and the rule with the lowest priority is lastly identified. Or if a rule with the highest priority has been identified not to be met, the identifying step may stop and notifying the mom the unmet rule.

A rule may be considered to be met, if the posture is according to the rule for longer or equal to a predefined period, or longer than or equal to a threshold period in a predefined period. For example, a rule may be considered to be met if the posture is according to it for the total 5 seconds, or the rule may also be considered to be met if the posture is according to the rule for longer than or equal to 3 seconds in a total 5 seconds.

If a rule is identified as not met, a notification to the mom may be outputted, for example, via a least one of audio, text, image, animation and video. Only the rule with the highest priority not met is notified, or all the rules not met are notified to the mom one by one according to the priority from high to low. Optionally, if after a certain period and/or a predefined times of notifications, one of the plurality of rules is still not met, ignoring the unmet rule (e.g., in both identifying and notifying).

The notifications may be generated based on the rules, for example,

1. "Support the neck of the baby with your elbow" according to basic rule 1;
2. "Support the back of the baby with your forearm" according to basic rule 2;
3. "Higher your front arm", "lower your front arm", "higher your lower arm", and/or "lower your lower arm" according to basic rule 3;
4. "Keep the head of the baby higher than the hips of the baby", "higher the head of the baby", or "lower the hips of the baby" according to basic rule 4.
5. "Keep the head (or ear), shoulder and hips of the baby in a straight line", "higher the neck of the baby", "lower the shoulder of the baby", or similar notifications, according to basic rule 5.
6. "Face the head of the baby to the breast", "turn the head of the baby the right", "keep the head of the baby closer (or farther) from the breast", or similar notifications, according to rule 6.

The mom may be expected to adjust her and/or baby's posture according to the notifications. Thus, steps 101, 102 and 103 and 104 may be performed iteratively (e.g., once for all steps in a certain period, e.g., every five seconds) until when all (or some predefined number of) the rules are met, where it may be determined that the breast feeding posture is correct.

For example, in every predefined period (e.g., 1 second, or depending on the time length of the notification(s)), an image is captured (101), displayed (102) and identified (103), and a notification is output (104).

For example, the notification in step 104 may include only the notification according to the highest rule that are not met, then a new image is captured (101), displayed (102) and identified (103). These steps iterative until all the rules are met. Alternatively, the output notification in step 104 may include all the notifications (e.g., in the priority order of the rules) based on the rules that are not met, then a new image is capture (101), displayed (102) and identified (103). These steps iterative until all the rules are met.

After all the rules are met, steps 101, 102, and 103 may still be performed for a certain period to guarantee that the mom and/or the baby is in a stable and correct status. The certain period may be a consecutive time period where all rules are met. For example, the certain period may be a consecutive of three seconds where no mistake is identified. Or the certain period may be a predefined number of consecutive iterations of steps 101, 102 and 103 where no mistake is identified (i.e., all rules are met).

If an unmet rule was notified for a certain number of times but the posture according to this rule is still not met, this rule may be skipped (e.g., considered as always correct) in some or all later steps. Or this rule may be skipped for a certain period (e.g., considered as correct during this certain period), and reconsidered after the certain period.

In step 105, if all the rules (e.g., all the rules that can be identified met or not) are met, start a timer to indicate that breast feeding starts. The timer may starts after the correct posture of the mom and/or the baby in step 104 has been identified consecutively for a period where all rules are met.

The timer is advantageous since it generate a record for breast feeding periods. The feeding periods may be compared, for example, according to the age of the baby and/or historic data, thus to monitor the growth and/or health of the baby. This also encourage the mom to keep the correct posture as long as possible. The timer is also an indication of the posture is correct. The time may also suggest whether the baby is fed enough or not when compared to other babies or historic data. If no baby has been identified in steps 103 and/or 104, the timer may be omitted.

If some rules cannot be determined to be met or not, e.g., because it is not able to identify a concerned key point/area, these rules may be all notified (before or after starting the timer) to the mom one by one in order to make sure that the mom receives all the information. Some other information may be output, for example some relaxing tips/suggestions, or a small piece of relaxing music, or a speech with a conforming voice. This may help the mom and the babies to relax.

In step 106, dynamically notify the mom to adjust the posture of the mom (and/or the baby) according to the plurality of rules for breast feeding during the breast feeding period. This step is the same as the step 104, where steps 101, 102, 103 and 104 may be iterative in the same way. The only difference is that a timer may be displayed. Another difference may be that the notification may be only output by not using audio, avoiding disturbing the baby. For example, the notification may be output via text, image, animation or video without sounds.

The timer may be stopped and recorded when the breast feeding ends. The breast feeding may be determined to be ended if the mom stopped the timer or close the application manually, or the mom leaves the image (e.g., partially or fully out of the capture images for a period), or the distance of the head of the baby and the feeding breast is larger than a predetermined distance for at least a time period.

Since during the breast feeding period, the mom may use the device for other functions (e.g., watching news/videos, sending emails, etc.), the application may run in the background (not closed), where the timer may still run. If the application is closed when it runs in the background, the user may be reminded when the application is open/started next time, e.g., notifying the user that the timer was terminated abnormally and/or asking the user to edit/input the last feeding time.

Figure 2:
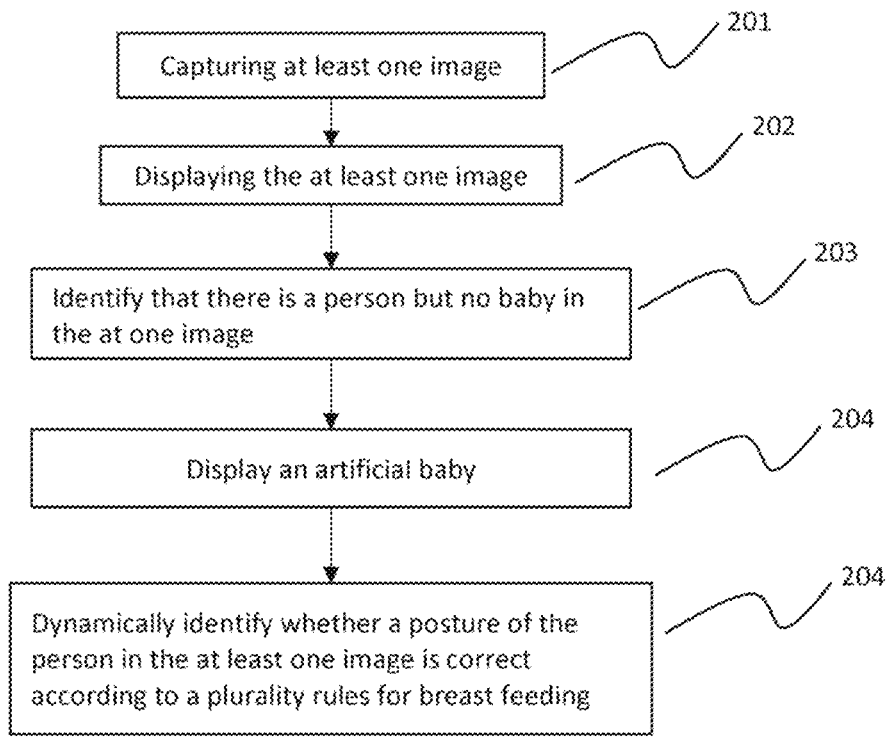
FIG. 2 shows a method for breast feeding coaching when no baby is identified.

FIG. 2 shows a method for breast feeding coaching when no baby is identified (e.g., no real baby and no fake baby are identified), which is an example of the method in FIG. 1.

Steps 201 and 202 are the same as steps 101 and 102 including all alternatives. For example a user (e.g., the mom) may start a breast feeding coaching application installed (or stored) on an electronic device before step 201 and then may select a feeding type, e.g., in a sitting breast feeding position or a lying on side breast feeding position. Alternatively, the feeding type may be detected and determined by the device (or an external device as explained for FIG. 1) by analyzing the captured image. Additional optional steps for FIG. 1 can apply to FIG. 2 as well, which will not be explained in detail here.

In step 203, it is identified that no baby appears in the image. Step 201 to 203 may be performed in an iterative way, for example once for both steps in each second. If after a certain period still no baby identified, it is determined that the application runs at the "no baby" mode (e.g., "breast feeding coaching mode"). The certain period may be a certain time period (e.g., 3 second) or a number of consecutively captured and analyzed images (e.g., five or ten images). After entering the "no baby" mode, the mom may be notify via audio, text, video, animation or any other methods that now the application runs in the "no baby" mode. The application may also directly receive an input from the user (i.e., the mom) to operate in a "no baby" mode, in which case, the identification step in step 203 may be omitted.

In step 204, an artificial baby may be displayed on top of the displayed image of the mom. The artificial baby may be an animation, an image, a movie or any other displayed object that representing a baby. Before displaying the artificial baby, the key points/areas and/or guiding outline of the mom may be identified. The position to display the artificial baby may be according to the identified key points/areas and/or guiding outline of the mom.

The baby may be displayed in a breast feeding position in the image. For example, the artificial baby may be displayed in front of the mom's chest. A left or right breast feeding position may be determined first, e.g., according to user input or by analyzing the at least one image. For example, if the left elbow of the mom is higher, it may be determined that the artificial baby head may be supported by the left elbow, thus, the baby may be determined to be fed by the left breast of the mom. Thus, the head of the artificial baby may be displayed on top of the left elbow of the mom, the edge of the head of the baby may attach to the elbow of the mom, and the body of the baby may be displayed on alongside the fore arm of the mom.

The position of the artificial baby may be displayed according to a feeding type, e.g., sitting for laying on side positon of the mom. For example, the above example may be applied in a sitting breast feeding type. If the mom is in a lying on side position, it may be determined that the baby is intended to be fed by the breast close to the bed (e.g., the lower breast in the image). For example, if the mom is lying on her left side, it may be determined that the baby is intended to be fed by the left breast. Then the head of the artificial baby may be displayed at the position of the left breast of the mom, and the body of the baby may be displayed in the same lying direction as the mom (e.g., the heads of the mom and the artificial baby is on the same direction). In a lying feeding position, the artificial baby may be displayed lying on the bed as well (i.e., not in an arm of the mom).

The size of the displayed artificial baby may be determined according to the identified key points/areas of the mom, e.g., arm length, head width, and/or shoulder width of the mom. For example, the artificial baby may have a length of about 0.8 to 1.5 times of the mom's shoulder width.

The displayed artificial baby may be dynamically adjusted/adapted according to each of the captured and or displayed image. Alternatively, once a position and size of the baby are determined, the artificial baby may be displayed in the same position for at least a period of time.

After the baby is displayed, the mom's posture is monitored and corrected in step 204, i.e., dynamically identifying and notifying whether a posture of a mom is correct according to a plurality of rules for breast feeding.

Before step 204, a notification may be output to indicate that the correction step starts.

Step 204 performs in a same way as steps 103 and/or 104. The difference is that an artificial baby is displayed. The rules that are only related the baby's key points/area may be omitted and only the rules relative to the mom's (or both the baby's and the mom's) key points/areas are included in the plurality of rules.

In all examples of the present invention, for example, in all figures, the rules for different feeding type may be different.

For example, the rules in a sitting breast feeding position may include and be prioritized in the below order (e.g., higher priority with smaller number, or in a different priority order):

1. One of or both arms of the mom are within certain area/range. E.g., whether the relative position of one for both arms of the mom when compared to other key points/areas is within a range. The output notification to the mom may include "please higher (and or lower) left arm (and or right arm) and/or left hand (and/or right hand)" if this rule is not met.

2. The elbow of the mom supports the neck of the baby. The neck of the baby may be identified directly or calculated according to the key points/areas of the head and shoulder of the baby.

3. The head of the baby is higher than the hips of the baby.

4. The head (or ear), shoulder and hips of the baby is in a straight line.

5. A forearm of the mom lies on the back of the baby. For example, if the left elbow of the mom is to support the neck of the baby, then the left forearm of the mom may lie on the back the baby to comfort/support the baby and at the same time the mom's left arm is in a comfortable position.

6. The head of the baby faces the feeding breast of the mom and the relative position between the head of the baby and the feeding breast is proper.

The rues in a lying on side breast feeding position may include and prioritized in the below order (higher priority with smaller number, or in a different priority order):

1. The mom should lie on one side and face the camera.

2. The mom should lay on side flatly (e.g., not supporting herself on an elbow or hand, which is not comfortable for the mom if it lasts longer than a certain period).

3. A forearm of the mom lies on the back of the baby. For example, if the mom is lying on her left, she may intend to feed the baby with her left breast, thus, it is comfortable for her to lie her right hand on the back area of the baby, which also comforts the baby.

4. The baby's head is not hold by a hand of the mom. The baby may not feel comfortable when forced by one or both hands of the mom.

5. The head (or ear), shoulder and hips of the baby is in a straight line.

6. The head of the baby faces the feeding breast of the mom and the relative position between the head of the baby and the feeding breast is proper.

In all the examples of this description, for example all figs, a scenario may be determined according to whether baby is fully or partially or not identified, which feeding type is used, and whether it is left or right breast feeding. The fully identified mode of the baby may be a mode where all the concerned key points/areas of the baby can be identified, e.g., all the key points/areas of the head, the shoulder and the hips of the baby. However, in real life, babies are not fully grown and may wear a lot or under a blanket, which make it difficult to identify all the concerned key points/areas. For example, the hips of the baby may be difficult to be identified under a blanket. A partially identified mode of the baby is in a mode where some (e.g., including the most important key point/area) but not all of the concerned key points/areas of the baby may be identified. For example, if only the head of the baby can be identified. A not identified mode (i.e., no baby mode, or breast feeding coaching mode) of the baby is a mode where all key points/areas may not be identified, or the most important key point/area may not be identified. For example, of none of the concerned head, should and hips of the baby can be identified, if the most important key point/area (e.g., the head of the baby) may not be identified.

The considered sets of rules may differ in different scenarios. For example, in a fully identified (of the key points/areas of the baby) mode, all the example rules (listed above for the sitting and lying on side position) may be included for all posture identifying steps in the present invention; in a partially identified mode, only the rules 1 and 6 for the sitting breast feeding position may be considered, and/or only the rules 1, 2, 4 and 6 for the lying on side breast feeding position may be considered; in a not identified mode, the example in FIG. 2 may apply, where a rule that only relates to a baby may be ignore and a rule that relates to the mom's posture and/or both the mom's and a baby's posture may be considered.

When identifying whether the rules are met in any steps of the present invention, the relative positions of key points/areas of the mom and/or the baby are analyzed. For example, the vertical distance between the key points/areas of the shoulder and breast (on the same side) of the mom or the length of the upper body of the mom may be used as a reference for the vertical positions of other key points/areas; and/or the distance between the key points/areas of the breast of the mom or the width of the key points/areas of the shoulder of the mom may be used as a reference for the horizontal positions for other key points/areas.

For example, in a left breast feeding position (e.g., either sitting for lying on side), the distance between the key points/areas of the left shoulder and left breast of the mom may be used as a vertical reference distance. Normally, the correct height of the feeding side elbow (left elbow in this case) should be at more or less the same height (and/or may be within a predetermined range) as the feeding breast. For example, the height of the feeding elbow should within the range of $c+0.5\,d$, where c is the height of the feeding breast and d is the distance between the key points/areas of the left shoulder and left breast of the mom. Thus, it can be determined whether to lift or lower the feeding forearm according to the identification results of the feeding elbow (i.e., if the feeding elbow is higher than the $c+0.5\,d$, then lower the feeding forearm, otherwise, higher the feeding forearm). The feeding side wrist position may be identified in a similar way, e.g., whether with in $c+0.2\,d$ and $c-0.8\,d$ (e.g., if higher than $c+0.2\,d$, lower the feeding side hand, otherwise higher the feeding side hand).

In the present invention, the key positions on non-feeding breast side may be identified in the same way as the feeding breast side, for example as described above. However, the position of some of the key points/areas on the non-feeding side may be skipped (e.g., considered always correct), for example the wrist of the mom not on the feeding side.

For example, when identifying whether the head of the baby faces to the feeding breast, the key point/area of the head of the baby has a positon of (x,y) in a x/y axis position system on the image and the key point/area of the feeding breast of the mom has a position of (u,v). Then x should be in the range of $u-0.5\,e$ and $u+0.5\,e$; and y should be in the range of $v-0.5\,d$ and $v+0.5\,d$, where e is the distance between the key points/areas of the left and right breast of the mom. If x or y is out of the ranges, then the mom is notified to just the head of baby to face the feeding breast.

Similarly, whether the mom's elbow is supporting the neck of the baby may be determined whether the distance between the key points/areas of the feeding side elbow and the shoulder of the baby are within a predefined range; whether a forearm of the mom lies on the back of the baby may be determined by at least one of the below conditions is met, a) whether the key point/area of the hand from the concerned forearm is in the back area of the baby, b) whether the key point/areas of the wrist from concerned forearm is in the back area of the baby, and c) whether a line connecting the wrist and elbow on the same side of the concerned forearm crosses the back area of the baby.

For example, when identifying whether the baby's head is hold by a hand of the mom, a length of the baby may be used as a reference distance (e.g., k), then whether the key point/area of any hand of the mom is within a certain area range is identified, e.g., within an area with the key point/area of the head of the baby as the center point and 0.1 k as the radius. If within this area, it is determined that the mom is holding the head of the baby and the mom is notified not to do so.

For example, when identifying whether the mom is facing the camera, it may be determined according whether some or all key points/areas on the face of the mom can be identified, e.g., two eyes and the nose (and/or mouth) of the mom. E.g., if all identified, then, it is identified that mom is facing the camera.

Since the scenarios may change between according baby fully identified, baby partially identify or no baby identified, or feeding type, or the feeding breast, e.g., from a scenario with baby to a scenario without baby. However, the rules and/or the displayed information may have a delay in change according to the change of the scenarios. For example, when a previous scenario changes to a changed scenario, the rule set will not be changed immediately, but only after the changed scenario is identified being lasted for a certain period (e.g., more than five seconds). Similarly, the displayed user interface and/or notifications will still be according to the previous scenario for a while before change. This is advantages, especially to improve the user experience, e.g., avoiding switching the rules and user interface too often due to some short/temporary events. For example, the mom may only want to stretch one arm and immediately go back to the correct feeding position, where it does not need to change the rules at all.

In the examples of the present invention, after the mom enters a correct feeding posture (e.g., after steps 104 and 204), the rules that have been identified not to be met in at least one of the previous scenarios (if the scenario changed) may be notified to the mom again, even though this rule may not apply to the current scenario anymore. This is to insure that the mom get all the important instructions and rules.

In any of the steps as explained in FIGS. 1 and 2, the user may be able to actively turn on/off the camera. For example, during steps 106, the user may turn the camera off since the posture has been corrected already. In such a manner, no dynamic correction may be performed in step 106.

Figure 3:
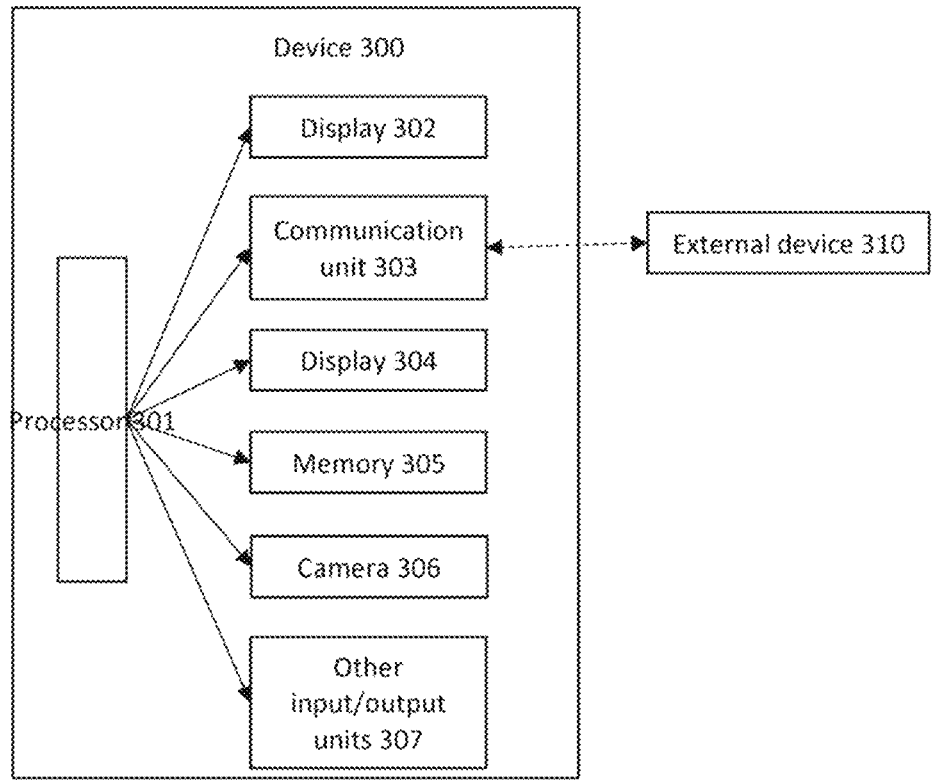
FIG. 3 shows a device for breast feeding coaching.

FIG. 3 shows a device 300, e.g., a mobile phone, tablet, laptop, desktop, smart watch, a TV, etc., to perform the present invention.

The device 300 may comprise a processor 301, a display 302, a communication unit 303, a memory 305, a camera 306 and other input/output units 307.

The processor 301 is configured to perform the program/instructions stored in the memory 305, e.g., via controlling other components such as the display 302, the communication unit 303, the memory 305, the camera 306 and other input/output units 307.

The displayed 302 may be controlled the processor 301 to perform the all the displaying function (and input function if it is a touch screen) in the present invention such as in steps 102, 105, 202.

The communication unit 303 may be controlled by the processor 301 to perform all communication function in the present invention. For example, if an external device 310 (e.g., an sever) is used to perform some of or all the identifying functions in the present invention, e.g., steps 103, 106, 203 and 204, messages are communicated via the communication unit 303, such as transmitting the images and/or receiving the identifying results. Optionally, the image may be not stored in the external device 310 for privacy reasons, e.g., after each identifying step, the image is immediately deleted in the external device 310.

The memory 305 is configured to store the breast feeding application software and/or data. For example, the scenarios, the basic rules, the corresponding rule for each scenario, the captured images, identified results, user profile, usage history, feeding records, relaxing tips, and other guidance, etc. The application may provide at least one entry for the user to check/overviewing these data, e.g., the feeding record, the rules, the relaxing tips and other guidance etc.

The camera 306 is configured to capture images in the present invention, e.g., in steps 101 and 201.

The other input/output units 307 are configured to perform other input/output functions of the present invention, for example, to out audio notifications in steps 106 and 204, or receive user input for the feeding type and/or mode of the baby (e.g., fully, partially or not identified) and/or any other use settings.

In the present invention, at least a part of the device (e.g., FIG. 3) or method (e.g., FIGS. 1 and 2) may be implemented as instructions stored in a non-transitory computer-readable storage medium, e.g., in the form of a program module, a piece of software, a mobile app, and/or other forms. The instructions, when executed by a processor (e.g., the processor 301), may enable the processor to carry out a corresponding function according to the present invention. The non-transitory computer-readable storage medium may be e.g., the memory 305.

According to an embodiment of the present invention, a method for breast feeding coaching comprises: capturing at least one image; displaying the at least one image; identifying whether a posture of a person in the at least one image is correct according to a plurality of rules for breast feeding; dynamically notifying the person to adjust the posture of the person until each of the plurality of rules is met; starting a timer; further identifying the posture of the person and notifying the person to adjust the posture of the person according to the plurality of rules during the breast feeding; ending and recording the timer when breast feeding ends.

According to an embodiment of the present invention, the method may comprise: identifying a feeding type or receiving an input for indicating the feeding type, for example whether the person is in a sitting feeding position or a lying on side feeding position.

According to an embodiment of the present invention, the method may further comprise: sending the at least one image to an external device; receiving the identifying results of the posture of the person from the external device; or wherein the identifying the posture of the person is performed by the electronic device.

According to an embodiment of the present invention, the identifying the posture of the person according to the plurality of rules, may further comprise: identifying according to a priority order of the plurality of rules; and/or wherein the plurality of rules include both at least one standard posture of the person and at least one standard posture of a baby.

According to an embodiment of the present invention, at least one of the dynamically notifying of the person to adjust the posture of the person, may further comprise: notifying the person according to the priority order of the plurality of rules which are not met; and/or the notifying is via at least one of methods audio, text, image, animation and video.

According to an embodiment of the present invention, at least one of the dynamically notifying of the person to adjust the posture of the person, may further comprise: identifying a rule with the highest priority amongst rules that are not met; only notifying the rule with the highest priority to the person at a time; and/or wherein if after a certain period and/or a predefined times of notifications, one of the plurality of rules is still not met, ignoring the unmet rule.

According to an embodiment of the present invention, the method may further comprise: identifying whether a baby appears in the at least one image; if no baby is identified, displaying an artificial baby and entering a coaching mode, if a baby is identified, entering a breast feeding mode; and/or in the coaching mode, the timer will not be started.

According to an embodiment of the present invention, the method may further comprise: identifying whether the posture of a baby in the at least one image is correct according to the plurality of rules.

According to an embodiment of the present invention, the identifying of the posture of the person and/or the baby, may further comprise: identifying at least one key point and/or at least one key area of the person and/or the baby; and comparing positions of the identified at least one key point and/or at least one key area to the plurality of rules; wherein the plurality of rules include key point and/or key area information of the person and/or baby in a correct breast feeding status.

According to an embodiment of the present invention, the method may further comprise: identifying a feeding scenario depending on at least one of a feeding type, whether a feeding breast is left or right, and whether a baby is fully identified, partially identified or not identified; and/or wherein the plurality of rules include different sets of rules in different scenarios.

According to an embodiment of the present invention, if a previous scenario switches to a changed scenario, the set of rules according to the previous scenario may switch to the set of rules according to the changed scenario when the change scenario is identified for longer than a period.

According to an embodiment of the present invention, if the baby is partially identified when one or more than one key points and/or key areas but not all the key points and/or key areas of the baby are identified, the plurality of rules may exclude rules related to the not identified key points and/or key areas of the baby.

According to an embodiment of the present invention, the method may further comprise, displaying a guiding outline of the person and/or the baby on the display before and/or during the identifying of the posture of the person and/or the posture of the baby.

According to an embodiment of the present invention, the plurality of rules may be based on a vertical reference distance between a shoulder and a breast on a same side of the person.

According to an embodiment of the present invention, the plurality of rules may be based on a horizontal reference distance between breasts of the person, or a horizontal reference distance between shoulders of the person.

According to an embodiment of the present invention, an electronic device comprising a camera, a display, and a processor to perform the method of the present invention.

According to an embodiment of the present invention, a storage medium configured to store instructions executed by at least one processor to perform the method of the present invention.

The invention claimed is:

1. A method for breast feeding coaching comprising:
capturing at least one image;
displaying the at least one image;
identifying whether a posture of a person in the at least one image is correct according to a plurality of rules for breast feeding;
dynamically notifying the person to adjust the posture of the person until each of the plurality of rules is met;
starting a timer;
further identifying the posture of the person and notifying the person to adjust the posture of the person according to the plurality of rules during the breast feeding;
ending and recording the timer when breast feeding ends,
wherein the plurality of rules includes:
a vertical reference distance between a shoulder and a breast on a same side of the person,
a horizontal reference distance between breasts of the person, and
a horizontal reference distance between shoulders of the person,
wherein the plurality of rules evaluates breastfeeding posture by comparing the reference distances to predetermined optimal ranges for breastfeeding positions, and
wherein the predetermined optimal ranges are determined based on analysis of successful breastfeeding postures.

2. The method in claim 1, further comprises:
identifying a feeding type or receiving an input for indicating the feeding type, for example whether the person is in a sitting feeding position or a lying on side feeding position.

3. The method in claim 1, further comprises:
sending the at least one image to an external device;
receiving the identifying results of the posture of the person from the external device; or
wherein the identifying the posture of the person is performed by the electronic device.

4. The method in claim 3, wherein at least one of the dynamically notifying of the person to adjust the posture of the person, further comprises:
notifying the person according to the priority order of the plurality of rules which are not met, wherein notifying the person is via at least one of methods audio, text, image, animation and video.

5. The method in claim 4, wherein at least one of the dynamically notifying of the person to adjust the posture of the person, further comprises:
identifying a rule with the highest priority amongst rules that are not met; only notifying the rule with the highest priority to the person at a time,
wherein if after a certain period or a predefined time of notifications, one of the plurality of rules is still not met, ignoring the unmet rule.

6. The method in claim 1, wherein the identifying the posture of the person according to the plurality of rules, further comprises:
identifying according to a priority order of the plurality of rules,
wherein the plurality of rules includes both at least one standard posture of the person and at least one standard posture of a baby.

7. The method in claim 1, further comprises:
identifying whether a baby appears in the at least one image;
if the baby is not identified, displaying an artificial baby and entering a coaching mode, wherein the timer is not started,
if the baby is identified, entering a breast feeding mode.

8. The method in claim 7, further comprises:
identifying whether a posture of the baby in the at least one image is correct according to the plurality of rules.

9. The method in claim 8, wherein the identifying of the posture of the person or the baby, further comprises:
identifying at least one key point or at least one key area of the person or the baby; and
comparing positions of the identified at least one key point or at least one key area to the plurality of rules;
wherein the plurality of rules includes key point or key area information of the person or baby in a correct breast feeding status.

10. The method in claim 1, further comprises:
Identifying a feeding scenario depending on at least one of a feeding type, whether a feeding breast is left or right, and whether the baby is fully identified, partially identified or not identified,
wherein the plurality of rules includes different sets of rules in different scenarios.

11. The method in claim 10, wherein if a previous scenario switches to a changed scenario, the set of rules according to the previous scenario switches to the set of rules according to the changed scenario when the change scenario is identified for longer than a period.

12. The method in claim 10, wherein if the baby is partially identified when one or more than one key points or key areas but not all the key points or key areas of the baby are identified, the plurality of rules excludes rules related to the not identified key points or key areas of the baby.

13. The method in claim 12, further comprises,
displaying a guiding outline of the person or the baby on the display before or during the identifying of the posture of the person or the posture of the baby.

14. An electronic device comprising:
a camera;
a display; and
a processer configured to:
capture at least one image;
display the at least one image;
identify whether a posture of a person in the at least one image is correct according to a plurality of rules for breast feeding;
dynamically notify the person to adjust the posture of the person until each of the plurality of rules is met;
start a timer;
further identify the posture of the person and notifying the person to adjust the posture of the person according to the plurality of rules during the breast feeding;
end and record the timer when breast feeding ends, wherein the plurality of rules includes:
a vertical reference distance between a shoulder and a breast on a same side of the person,
a horizontal reference distance between breasts of the person, and
a horizontal reference distance between shoulders of the person,
wherein the plurality of rules specifically evaluates breast-feeding posture by comparing the reference distances to predetermined optimal ranges for breastfeeding positions, and
wherein the predetermined optimal ranges are determined based on analysis of successful breastfeeding postures.

15. A storage medium configured to store instructions executed by at least one processor to:
capture at least one image;
display the at least one image;
identify whether a posture of a person in the at least one image is correct according to a plurality of rules for breast feeding;
dynamically notify the person to adjust the posture of the person until each of the plurality of rules is met;
start a timer;
further identify the posture of the person and notifying the person to adjust the posture of the person according to the plurality of rules during the breast feeding;
end and record the timer when breast feeding ends,
wherein the plurality of rules includes:
a vertical reference distance between a shoulder and a breast on a same side of the person,
a horizontal reference distance between breasts of the person, and
a horizontal reference distance between shoulders of the person,
wherein the plurality of rules specifically evaluates breast-feeding posture by comparing the reference distances to predetermined optimal ranges for breastfeeding positions, and
wherein the predetermined optimal ranges are determined based on analysis of successful breastfeeding postures.

* * * * *